US012458014B1

(12) United States Patent
Cridge et al.

(10) Patent No.: US 12,458,014 B1
(45) Date of Patent: Nov. 4, 2025

(54) ANIMAL MONITORING AND DETERRENT DEVICE

(71) Applicant: Cornerstone Research Group, Inc., Miamisburg, OH (US)

(72) Inventors: Mark C. Cridge, Miamisburg, OH (US); Trang T. Young, Dayton, OH (US); Kevin D. Blount, West Chester, OH (US); Zachary D. Reser, Dayton, OH (US); Matthew S. Benefiel, Xenia, OH (US); Brian E. Henslee, Galloway, OH (US)

(73) Assignee: Cornerstone Research Group, Inc., Miamisburg, OH (US)

( * ) Notice: Subject to any disclaimer, the term of this patent is extended or adjusted under 35 U.S.C. 154(b) by 157 days.

(21) Appl. No.: 18/159,920

(22) Filed: Jan. 26, 2023

Related U.S. Application Data

(60) Provisional application No. 63/303,104, filed on Jan. 26, 2022.

(51) Int. Cl.
*A01M 29/12* (2011.01)
(52) U.S. Cl.
CPC .................................. *A01M 29/12* (2013.01)
(58) Field of Classification Search
CPC ...... A01M 29/30; A01M 29/00; A01M 29/06; A01M 29/10; A01M 29/12; A01K 29/005; A01K 15/02; A01K 15/021
USPC ............... 119/712, 719; 43/1, 124; 116/22 A
See application file for complete search history.

(56) References Cited

U.S. PATENT DOCUMENTS

| | | | | |
|---|---|---|---|---|
| 5,009,192 | A * | 4/1991 | Burman | A01M 29/30 239/69 |
| 9,044,770 | B1 * | 6/2015 | Eyring | A01M 29/30 |
| 11,104,504 | B1 * | 8/2021 | Solberg | B65D 83/267 |
| 2008/0314334 | A1 * | 12/2008 | Dalton | A01M 29/10 119/719 |
| 2009/0261180 | A1 * | 10/2009 | Donoho | A01M 29/12 239/69 |
| 2014/0336263 | A1 * | 11/2014 | Krebs | A01M 31/002 514/688 |

* cited by examiner

*Primary Examiner* — Monica L Perry
*Assistant Examiner* — Maria E Graber
(74) *Attorney, Agent, or Firm* — Dinsmore & Shohl LLP

(57) ABSTRACT

An animal monitoring and deterrent device includes a lure body, one or more sensors, an animal deterrent mechanism, a mounting fixture, and a controller. The lure body is configured to attract the attention of a pest animal. The sensors are configured to detect movement or presence of the pest animal proximal to the device. The animal deterrent mechanism includes a source of animal deterrent and an animal deterrent delivery system. The animal deterrent delivery system is fluidly connected to the source of animal deterrent and is configured to disperse the animal deterrent upon activation of the animal deterrent delivery system. The mounting allows at least one of rotational, pivotal, or translational motion of the lure body. The controller is communicatively connected to the one or more sensors and the animal deterrent mechanism and analyzes data generated by the sensors to initiate release of the animal deterrent.

17 Claims, 10 Drawing Sheets

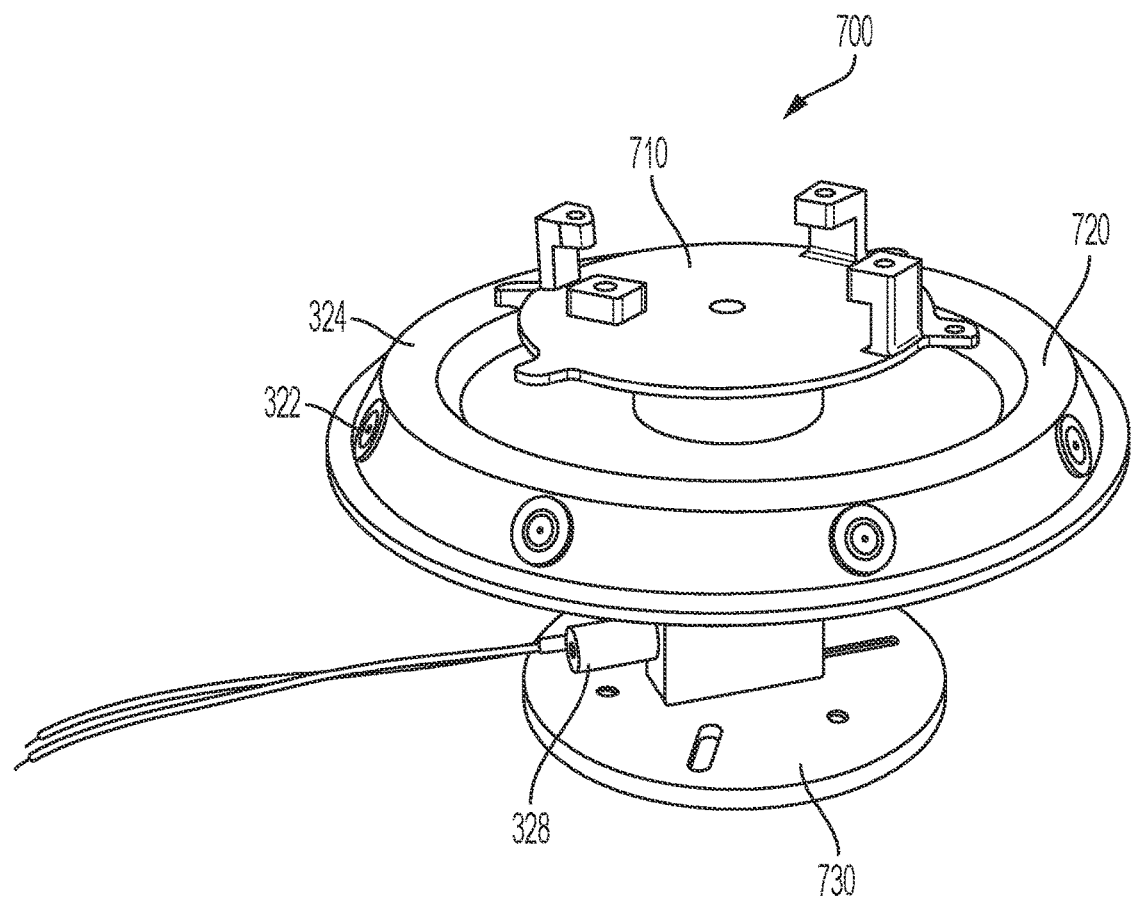
FIG. 9
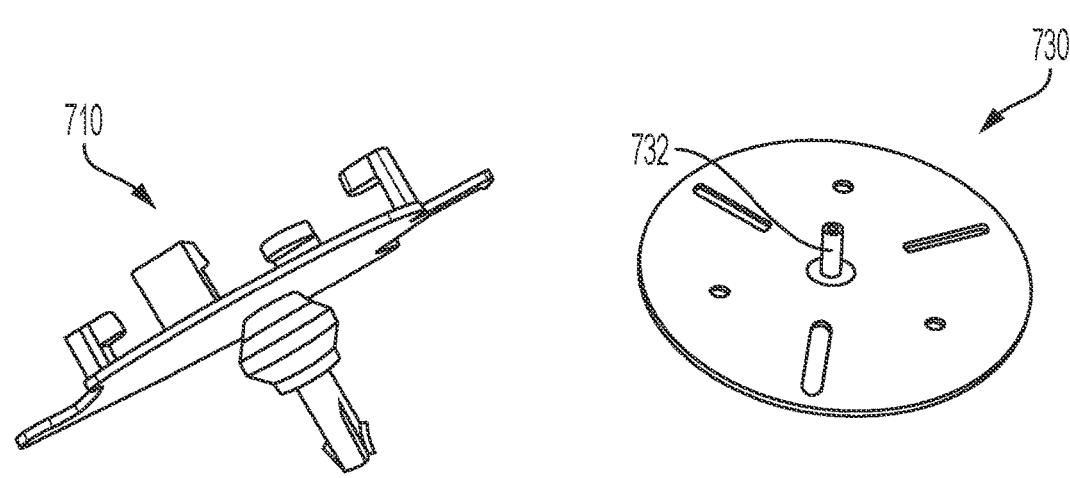
FIG. 10
FIG. 11

ANIMAL MONITORING AND DETERRENT DEVICE

CROSS-REFERENCE TO RELATED APPLICATIONS

This application claims priority to U.S. Provisional Application 63/303,104, filed Jan. 26, 2022, which is incorporated by reference herein in its entirety.

STATEMENT REGARDING FEDERALLY SPONSORED RESEARCH OR DEVELOPMENT

This invention was made with U.S. Government support under Contract No. FA9302-20-C-0007 awarded by the U.S. Air Force Test Center Directorate of Contracting to Cornerstone Research Group Inc. The U.S. Government has certain rights in the invention.

TECHNICAL FIELD

Embodiments of the present disclosure relate to animal monitoring and deterrent devices.

BACKGROUND

The use of lethal means to control the overabundance of a problematic predator (e.g. raven), pest animals, or insects ("pest animal") has a long history and is sometimes controversial. The growing popular opposition to large-scale lethal control of wildlife increases the expense of such animal control and decreases its long-term efficacy. Alternative, non-lethal approaches to animal management exist. These include hazing to drive undesirable animals from specific treatment areas, placement of effigies of dead conspecifics, and habitat alterations to reduce the attractiveness to pest animals. Other non-lethal approaches to animal management may include animal behavior modification through aversive training. The ability to alter predatory and/or other problematic animal behavior in a highly targeted manner without resorting to lethal alternatives has the potential to solve thorny conservation challenges in a cost-efficient manner with a minimum of controversy and opposition from animal rights groups.

SUMMARY

In is desirable to develop tools and methods to monitor and teach pest animals to avoid certain food items where predation is detrimental to the environment or for the conservation of certain species. If implemented correctly, such tools can eliminate the undesired behavior for the lifetime of the trained animal. Furthermore, such aversion training approach can help to eliminate labor-intensive lethal hunting programs and reduce pressure for costly labor-intensive breeding, relocation, and reintroduction programs for any threatened or endangered species preyed on by the pest animal. This aversion training approach works especially well in social species, whose members monitor each other's behavior, as the potential exists for the desired behavior to spread to animals not directly affected by the treatment. As such, there is an ongoing need for the development of simple, low cost, and practical aversive animal training and monitoring technology which may prove invaluable for management of domestic and/or farm animals, as well as for wildlife.

The present disclosure provides animal monitoring and deterrent devices with a lure body, a variety of sensors for detecting the animal's presence in the device's vicinity, and an animal deterrent mechanism to deliver an animal deterrent in the form of a chemical irritant when the sensor detects the presence and actions of the pest animal.

Embodiments of the present disclosure relate to an animal monitoring and deterrent device. The animal monitoring and deterrent device includes a lure body, the lure body configured to attract the attention of a pest animal and conceal one or more components of the device; one or more sensors, the sensors configured to detect movement or presence of the pest animal proximal to the device; an animal deterrent mechanism; a mounting fixture; and a controller communicatively connected to the one or more sensors and the animal deterrent mechanism, where the controller analyzes data generated by the sensors and activates the animal deterrent mechanism to release the animal deterrent from the source of animal deterrent. The animal deterrent mechanism includes a source of animal deterrent, wherein the source of animal deterrent is a pressurized or pumped liquid, gas, or aerosol of an irritant to the pest animal, and an animal deterrent delivery system fluidly connected to the source of animal deterrent. Further, the animal deterrent delivery system is configured to disperse the animal deterrent upon activation of the animal deterrent delivery system, wherein the animal deterrent delivery systems comprises a triggering mechanism that releases at least a portion of the animal deterrent from the source of animal deterrent upon receipt of a signal from the controller. The mounting fixture is engaged with the lure body and is configured to secure the lure body to a base structure engaged with a substrate, wherein the mounting fixture allows at least one of rotational, pivotal, or translational motion of the lure body relative to the substrate.

BRIEF DESCRIPTION OF THE DRAWINGS

The following detailed description of specific embodiments of the present disclosure can be best understood when read in conjunction with the following drawings, in which:

FIG. 9 is an illustration of a mounting fixture of an animal monitoring and deterrent device in accordance with one or more embodiments of the present disclosure;

FIG. 10 is an illustration of a mount portion of a mounting fixture of an animal monitoring and deterrent device in accordance with one or more embodiments of the present disclosure;

FIG. 11 is an illustration of an animal deterrent source adaptor portion of a mounting fixture of an animal monitoring and deterrent device in accordance with one or more embodiments of the present disclosure;

DETAILED DESCRIPTION

Figure 1:
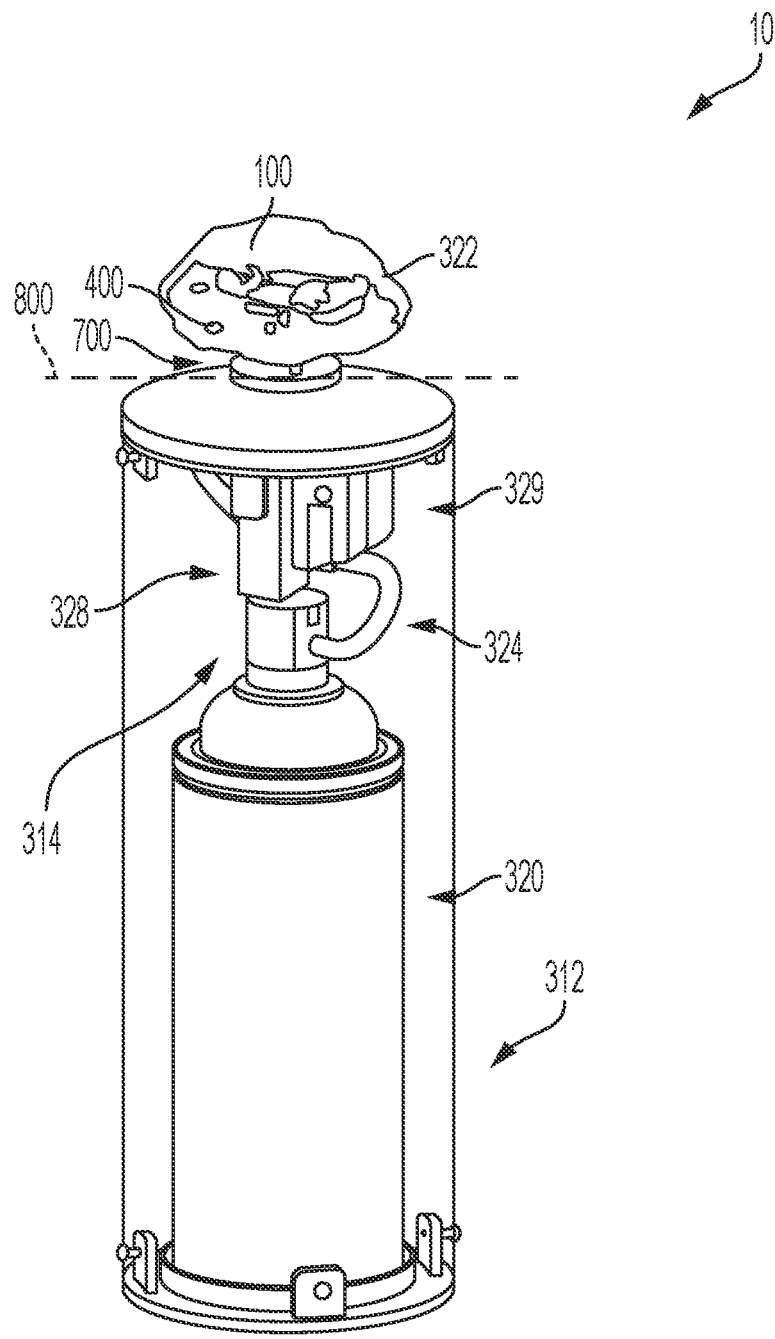
FIG. 1 is a schematic illustration of an animal monitoring and deterrent device in accordance with one or more embodiments of the present disclosure.

Embodiments of the present disclosure generally relate to an animal monitoring and deterrent device.

In accordance with embodiments of an animal monitoring and deterrent device 10 and with reference to FIGS. 1-4, the device comprises a lure body 100, one or more sensors 200, an animal deterrent mechanism 300, a mounting fixture 700 engaged with the lure body 100, and a controller 400. The lure body 100 is configured to attract the attention of a pest animal and conceal one or more components of the device 10. Further, the sensors 200 are configured to detect movement or presence of the pest animal proximal to the device 10. The animal deterrent mechanism 300 actively drives the pest animal away and comprises a source of animal deterrent 310 and an animal deterrent delivery system 320 fluidly connected to the source of animal deterrent 310. The animal deterrent delivery system 320 is configured to disperse the animal deterrent upon activation of the animal deterrent delivery system 320. The mounting fixture 700 is configured to secure the lure body to a base structure engaged with a substrate while allowing at least one of rotational, pivotal, or translational motion of the lure body relative to the substrate. Finally, the controller 400 is communicatively connected to the one or more sensors 200 and the animal deterrent mechanism 300. The controller 400 analyzes data generated by the sensors 200 and activates the animal deterrent mechanism 300 to release the animal deterrent from the source of animal deterrent 310.

Having generally described embodiments of animal monitoring and deterrent device in accordance with the present disclosure, further detail and additional embodiments will be provided.

With continued reference to FIGS. 1-4, the animal monitoring and deterrent device 10 includes a lure body 100. The lure body 100 is configured to attract the attention of a pest animal and conceal one or more components of the animal monitoring and deterrent device 10. The lure body 100, alternatively referenced as a decoy, may be made into any desirable shape or form to attract the attention of the pest animal. In one or more embodiments, the lure body 100 may comprises a shaped exterior surface replicating the appearance of an animal body, egg, nest, or shelter. For example, the lure body 100 may be formed into a geometry that resembles an animal's body, such as a tortoise shell. The coloration of the lure body 100 may also be adjusted to replicate the object being masqueraded. In further embodiments, the lure body 100 may be made into a geometry that has the appearance of an egg or nest.

In one or more embodiments, the lure body 100 may be formed using any conventional plastic molding technique such as injection molding, or other plastic article manufacturing techniques such as 3D printing. For example, the lure body 100 be formed from any thermoplastic or thermosetting resin commonly used in the plastic molding industries. Example, thermoplastic or thermosetting resins include polyether ether ketone (PEEK), polyetherimide, polycarbonate, and acrylonitrile butadiene styrene (ABS).

Figure 5:
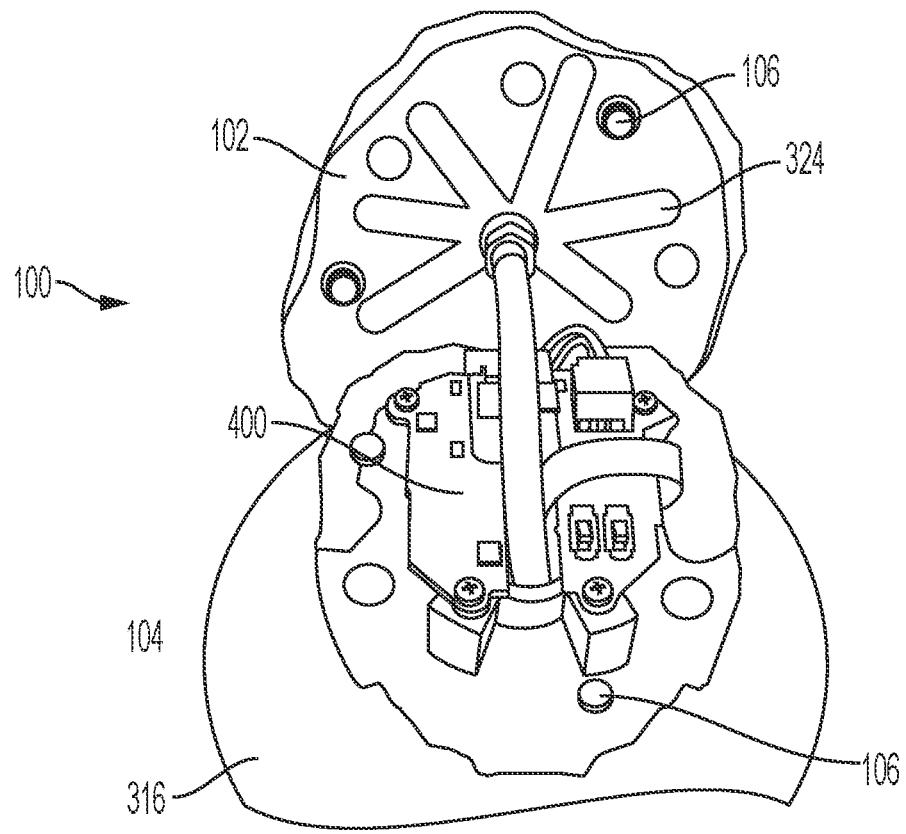
FIG. 5 is an illustration of a lure body in accordance with one or more embodiments of the present disclosure.
Figure 6:
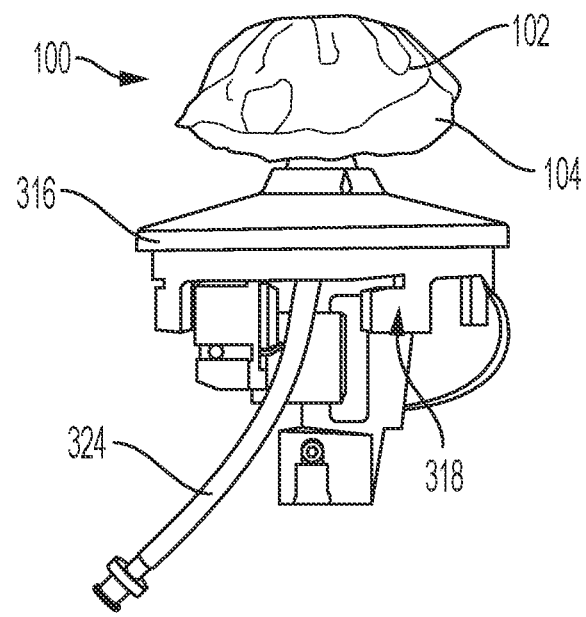
FIG. 6 is an illustration of a lure body of an animal monitoring and deterrent device in accordance with one or more embodiments of the present disclosure.

In one or more embodiments, the lure body 100 may be formed from synthetic materials or natural materials to replicate the visual characteristics of the object the lure body 100 is modeling. For example, to imitate a nest a natural fiber or manufactured synthetic material may be utilized to replicate grass or sticks. Additionally, leather, fur, or feathers may be utilized to imitate appropriate animals In one or more embodiments, the lure body 100 comprises at least two parts which may be reversibly separated to access an interior volume of the lure body 100. For example, as illustrated in FIGS. 5 and 6, the lure body 100 may include a first lure body 102 and a second lure body 104 which mate together to form a complete structure forming the lure body 100. In one or more embodiments, the first lure body 102 and the second lure body 104 may be reversibly connected with magnets 106 having complementary polarity integrated into or affixed to each of the first lure body 102 and the second lure body 104. In further embodiments, the first lure body 102 and the second lure body 104 may be connected with adhesive, screws or other fasteners, or tape, for example.

With reference to FIGS. 2-4, 12, 13A, and 13B, the animal monitoring and deterrent device 10 includes one or more sensors 200. The sensors 200 are configured to detect movement or presence of the pest animal proximal to the device. Upon placement of the animal monitoring and deterrent device 10, the one or more sensors 200 may actively or passively survey the region of the animal monitoring and deterrent device 10 to sense the presence of the pes animal proximal the device through detection of motion and/or disturbance by the pest animal.

In one or more embodiment, the sensors 200 used with the animal monitoring and deterrent device 10 to detect the presence of the pest animal may be an accelerometer, an angular sensor or gyroscope, an inertial measurement unit (IMU), a shock sensor, a proximity sensor, a capacitive sensor. It will be appreciated that an accelerometer, an angular sensor, an inertial measurement unit, and/or a shock sensor mounted on or integrated with the lure body 100 of the animal monitoring and deterrent device 10 provides indication by the one or more sensors 200 of physical disruption of the animal monitoring and deterrent device 10. Specifically, physical contact between the animal monitoring and deterrent device 10 and a target pest animal would result in one or more of the accelerometer, the angular sensor, the inertial measurement unit, and/or the shock sensor providing an output indicative of movement of the animal monitoring and deterrent device 10. These types of sensors 200 can be used to sense contact and/or pressure from the animal of interest on the animal monitoring and deterrent device 10 when disturbed by the pest animal. It will be appreciated that an IMU is a sensor component which is made up of an accelerometer, gyroscope, and magnetometer.

In one or more embodiments with an accelerometer, gyroscope or IMU included, potential sensors include a combination accelerometer and gyroscope such as the ISM330DLC commercially available from STMicroelectronics (Geneva, Switzerland). In one or more embodiments, the accelerometers may have an operational range of 0 to +/−100 times the acceleration of gravity (g) with a sampling frequency of 0.01 Hz to 2000 Hz. Example accelerometers include the KX134-1211 and KMX63-1055 commercially available from Kiomix (Ithaca, New York), ADXL356C commercially available from Analog Devices (Norwood, Massachusetts), and H3LIS331DL commercially available from STMicroelectronics. In one or more embodiments, the gyroscope may have an operational range of 0 to +/−2000 degree/sec with a sampling frequency of 0.01 Hz to 2000 Hz. Example gyroscopes include BMG 250 commercially available from Bosch Sensortec GmbH (Reutlingen, GERMANY), FXAS21002CQR1 commercially available from NXP Semiconductors (Eindhoven, Netherlands), and ITG-3701 commercially available from IvenSense (San Jose, California).

In one or more embodiment, the sensors 200 used with the animal monitoring and deterrent device 10 to detect the presence of the pest animal may include a sound sensor and/or an optical sensor. A sound sensor, such as a microphone, can be utilized to sense the presence of a pest animal without physical interaction between the pest animal and the animal monitoring and deterrent device 10. For example, the sound sensor may detect the distinct mating or predatory warning call of pest animal when the pest animal is still distant from the animal monitoring and deterrent device 10. Further, the sound sensor may detect rustling or other disturbances from movement of the pest animal through the environment surrounding the animal monitoring and deterrent device 10. Similarly, an optical sensor, such as a video camera, may detect motion in the environment surrounding the animal monitoring and deterrent device 10 which may be indicative of the presence of a pest animal. These types of sensors can be used to sense the motion and/or image of the animal of interest prowling in the vicinity off or when disturbing the animal monitoring and deterrent device 10.

Figure 2:
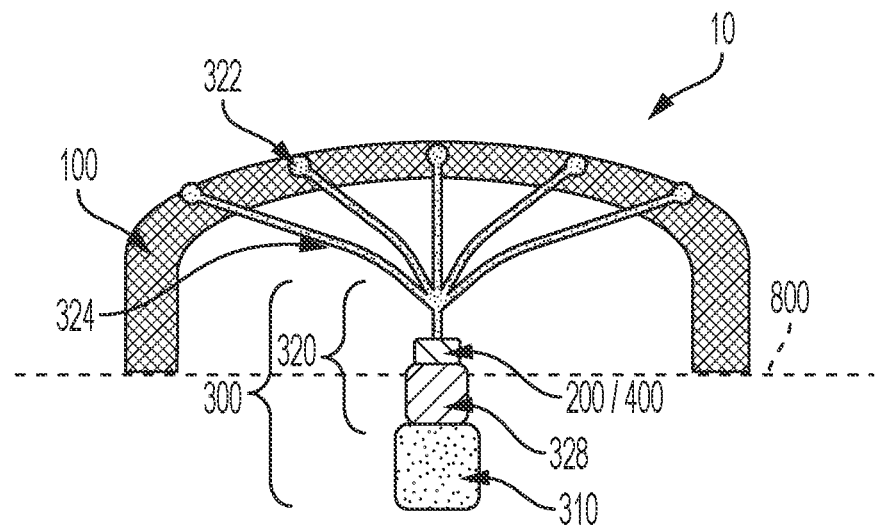
FIG. 2 is a schematic illustration of a cut view of an animal monitoring and deterrent device in accordance with one or more embodiments of the present disclosure.
Figure 3:
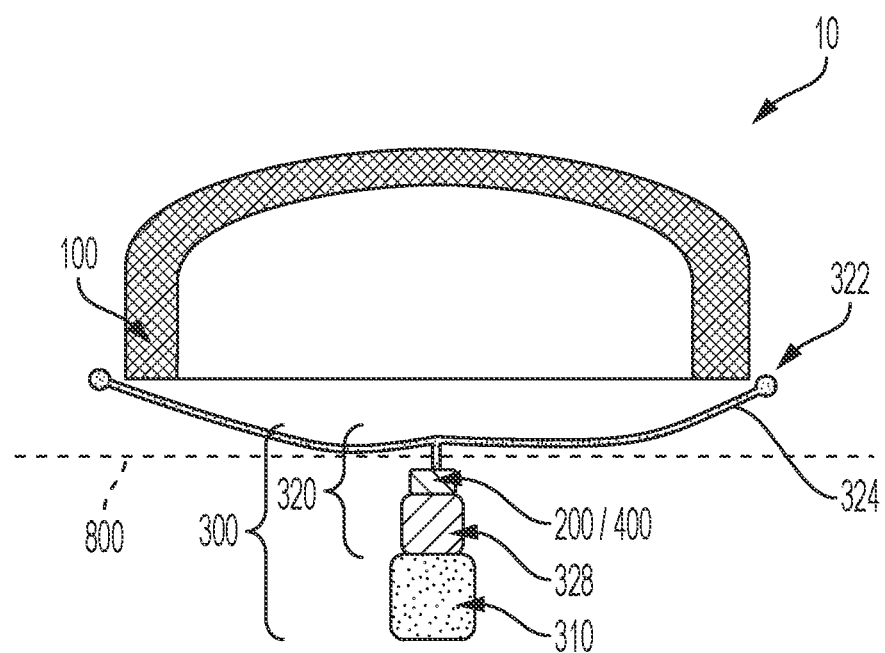
FIG. 3 is a schematic illustration of a cut view of an animal monitoring and deterrent device in accordance with one or more embodiments of the present disclosure.
Figure 4:
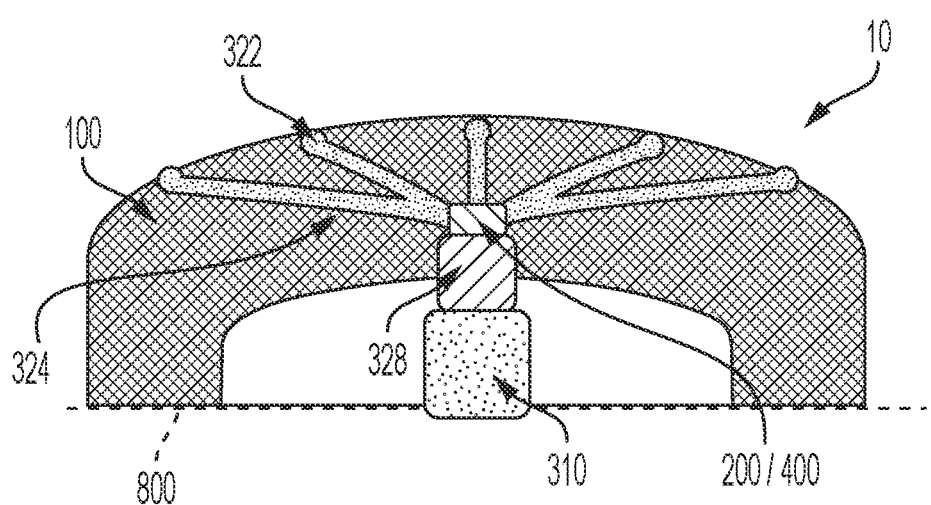
FIG. 4 is a schematic illustration of a cut view of an animal monitoring and deterrent device in accordance with one or more embodiments of the present disclosure.

With reference to FIGS. 2-4, the animal monitoring and deterrent device 10 includes an animal deterrent mechanism 300. The animal deterrent mechanism 300 is configured to discharge a chemical, sound, and/or electrical response to scare and/or irritate a pest animal which activated the animal monitoring and deterrent device 10.

In one or more embodiments, the animal deterrent mechanism 300 includes a source of animal deterrent 310 and an animal deterrent delivery system 320 fluidly connected to the source of animal deterrent 310. The animal deterrent delivery system 320 is configured to disperse the animal deterrent 310 upon activation of the animal deterrent delivery system 320.

In one or more embodiments, the animal deterrent provided in the source of animal deterrent 310 is an irritant to the pest animal. For example, the animal deterrent may comprises methyl anthranilate. Methyl anthranilate, also known as MA, methyl 2-aminobenzoate, or carbomethoxyaniline, is an ester of anthranilic acid and it has a strong and fruity grape smell. Methyl anthranilate acts as a bird repellent which may be useful as the animal deterrent when the pest animal is a bird. Methyl anthranilate works by irritating the pain receptor associated with a birds' senses of taste and smell, without causing any physical harm to the bird and after exposure the birds recognize the grape odor and are repelled away from the area where spraying has occurred. As methyl anthranilate is used as a flavoring of grape-flavored candy, soft drinks, chewing gum, and pharmaceuticals for human consumption inadvertent exposure during deployment of the animal monitoring and deterrent device 10 does not present excessive concern. In one or more further embodiments, the animal deterrent provided in the source of animal deterrent 310 may be capsicum powder or spray and derivatives, alcohol, or tear gas.

The source of animal deterrent 310 is a pressurized or pumped liquid, gas, or aerosol of an irritant to the pest animal. Providing the animal deterrent in a pressurized form, either stored in a pressurized vessel or pressurized on demand with a pump, allows for the animal deterrent to be dispersed in a high velocity manner from the animal monitoring and deterrent device 10.

In various embodiments, the source of animal deterrent 310 may be housed inside the lure body 100, in a separate container outside the lure body 100, buried underground or within the substrate 800, or positioned with other components of the animal monitoring and deterrent device 10. For illustration the level of the substrate 800 is shown at various different levels in FIGS. 1-4, but it will be appreciated that the level of the substrate 800 may be positioned differently than illustrated with all, some, or none of the source of animal deterrent 310 positioned within the substrate 800.

In one or more embodiments and with reference to FIG. 1, the animal monitoring and deterrent device 10 may also include a subterranean housing 312 with the source of animal deterrent 310, the controller 400, or both the source of animal deterrent 310 and the controller 400 positioned within the subterranean housing 312. The subterranean housing 312 may be positioned within the substrate 800 to protect the components of the animal monitoring and deterrent device 10 housed within the subterranean housing 312 from the surrounding environment. Specifically, the subterranean housing 312 may prevent contact between the components of the animal monitoring and deterrent device 10 housed within the subterranean housing 312 and water, dirt, insect, animals, or other environmental hazards in the substrate 800. The embodiment of FIG. 1 illustrates the source of animal deterrent 310 as a pressurized aerosol canister positioned within the subterranean housing 312 and the controller 400 positioned within the lure body 100. In accordance with such arrangement, the lure body 100 is the only visible component above ground level which maximizes the effectiveness of the illusion that the lure body 100 is a genuine nest, egg, animal shelter, or animal body.

In one or more embodiments, and with reference to FIG. 6, the subterranean housing 312 may be mated with a cap 316 which seals and open end of the subterranean housing 312. The cap 316 may be affixed to the subterranean housing 312 with a plurality of J-hook locks 318 as illustrated in FIG. 6. Specifically, the cap 316 may be positioned over the subterranean housing 312 and rotated to engage the J-hook locks 318 with mating pins in the subterranean housing 312. In various further embodiments, the cap 316 may be affixed to the subterranean housing 312 with adhesive, screws or other fasteners, or tape. In one or more embodiments, a compressible gasket may be provided between the cap 316 and the subterranean housing 312 to form a seal.

The animal deterrent delivery system 320 is connected to the source of animal deterrent 310 and disperses the animal deterrent upon activation of the animal deterrent delivery system 320. Specifically, the animal deterrent delivery system 320 mechanically controls flow of the animal deterrent from the source of animal deterrent 310 and transfers the animal deterrent to nozzles 322 or sprayers in communication with the environment surrounding the animal monitoring and deterrent device 10.

The animal deterrent provided as pressurized or pumped liquid, gas, or aerosol from the source of animal deterrent 310 may be delivered through the animal deterrent delivery system 320 integrated with the animal monitoring and deterrent device 10. The animal deterrent delivery system 320 may comprise a deterrent distribution manifold 324. In one or more embodiments, the deterrent distribution manifold 324 may be formed from rigid or flexible tubes that direct the spray of pressurized animal deterrent from the source of animal deterrent 310 to the nozzles 322 for distribution towards the target pest animal. In one or more embodiments, the deterrent distribution manifold 324 may be formed from a molded polymeric part with branching internal channels to provide the animal deterrent to a plurality of nozzles 322. In further embodiments, the deterrent distribution manifold 324 may be formed from a combination of rigid or flexible tubes and a molded polymeric part with branching internal channels to provide the animal deterrent to a plurality of nozzles 322.

In one or more embodiments and with reference to FIGS. 2-4, the animal deterrent delivery system 320 comprises a deterrent distribution manifold 324 to direct the animal deterrent towards one or more nozzles 322 to disperse the animal deterrent toward the pest animal. In one or more embodiments, the deterrent distribution manifold 324 may be formed from a single channel fluidly connected to the nozzle 322. As previously indicated, the deterrent distribution manifold 324 may be formed from a rigid or flexible tube that direct the spray of pressurized animal deterrent from the source of animal deterrent 310 to the nozzles 322 or may be integrated into a molded polymeric part, such as the lure body 100, to provide the animal deterrent to the nozzle 322.

In one or more further embodiments and with reference to FIGS. 1-4 and 7, the animal deterrent delivery system 320 may comprise a plurality of nozzles 322 to direct the animal deterrent in a plurality of directions. In accordance with such embodiments, the deterrent distribution manifold 324 may be formed from a plurality of channels, each fluidly connected to one or more of the nozzles 322. For example, nozzles 322 may be placed around the entire periphery of the lure body 100 to provide a 360 degree dispersion of animal deterrent. As previously indicated, the deterrent distribution manifold 324 may be formed from rigid or flexible tubes that direct the spray of pressurized animal deterrent from the source of animal deterrent 310 to the nozzles 322 or may be integrated as branching internal channels into a molded polymeric part, such as the lure body 100, to provide the animal deterrent to the plurality of nozzles 322.

Figure 7:
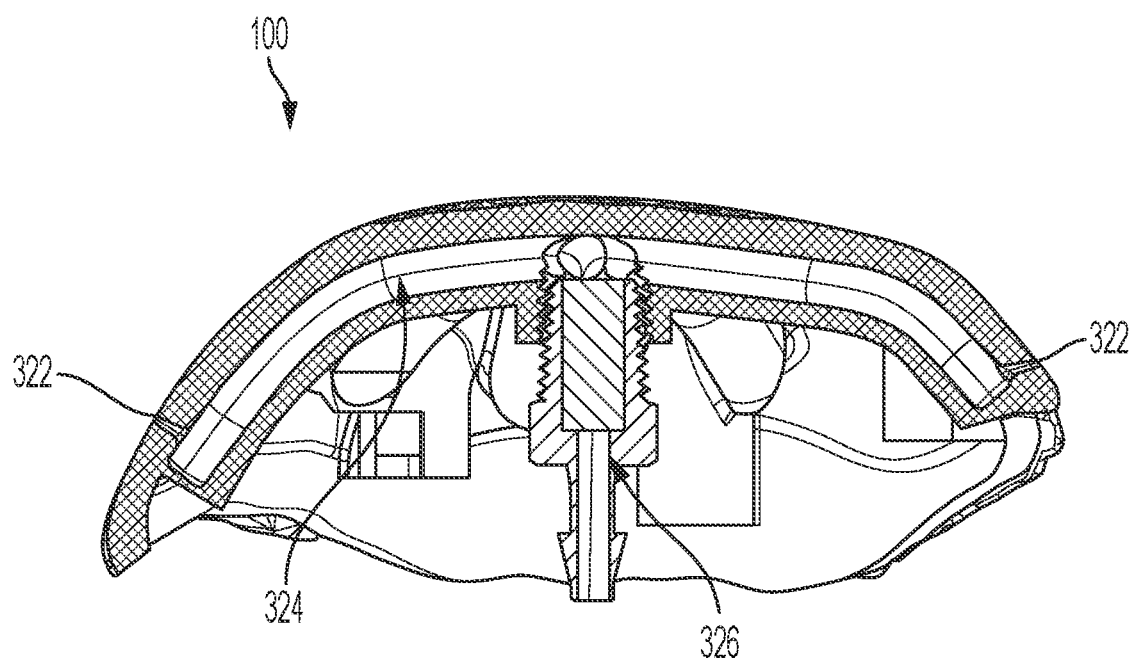
FIG. 7 is an illustration of a cut view of a lure body of an animal monitoring and deterrent device in accordance with one or more embodiments of the present disclosure.

In one or more embodiments and with reference to FIG. 7, the deterrent distribution manifold 324 may be integrated into the lure body 100 such that the deterrent distribution manifold 326 and the lure body 100 form a monolithic unit. Further, in one or more embodiments, the deterrent distribution manifold 324 may include a coupling 326 to connect rigid or flexible tubes with molded polymeric part with branching internal channels to form the complete deterrent distribution manifold 324. For example, as shown in FIG. 7, the lure body 100 may include branching internal channels provided within the structure of the lure body 100 which may be connected via the coupling 326 to rigid or flexible tubes fluidly connected with the source of animal deterrent 310. In various embodiments, the coupling 326 may be connected to the lure body 100 with a threaded connection, adhesive, or formed as an integral part of the lure body 100.

The animal deterrent delivery system 320 further comprises a triggering mechanism 328 that releases at least a portion of the animal deterrent from the source of animal deterrent 310 upon receipt of a signal from the controller 400. The triggering mechanism 328 allows for the source of animal deterrent 310 to be pressurized and only released on demand.

Figure 8:
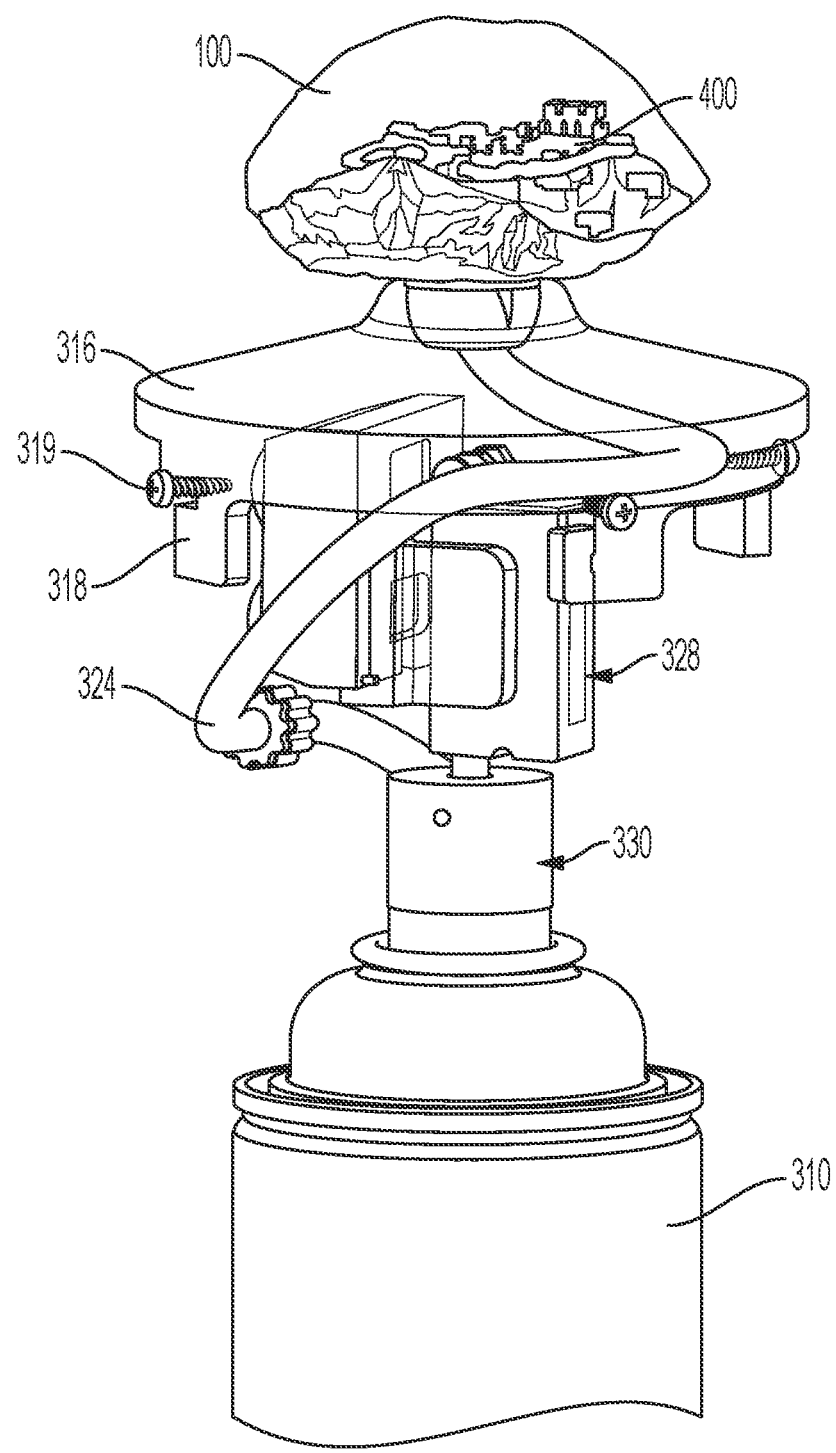
FIG. 8 is an illustration of an animal monitoring and deterrent device in accordance with one or more embodiments of the present disclosure.

In one or more embodiments, the triggering mechanism 328 may comprise a linear actuator to press the release on an aerosol type can to release pressurized animal deterrent. With reference to FIG. 8, the triggering mechanism 328 may be held in place with a triggering mechanism adaptor 330 configured to secure the triggering mechanism 328 in a position and orientation such that the animal deterrent is released from the source of animal deterrent 310 upon activation of the triggering mechanism 328. When the source of animal deterrent 310 is a pressurized aerosol canister the triggering mechanism adaptor 330 may be a cover which is affixed to the region of a push button which releases the contents of the pressurized aerosol canister. The cover additionally positions the linear actuator serving as the triggering mechanism 328 such that the linear actuator depresses the push button on the pressurized aerosol canister releasing the animal deterrent into the deterrent distribution manifold 324.

In one or more embodiments, the triggering mechanism 328 may comprise a solenoid valve provided in the deterrent distribution manifold 324 or tubing fluidly connecting the source of animal deterrent 310 and the deterrent distribution manifold 324.

In one or more embodiments and with reference to FIG. 1, the triggering mechanism 328 may include a triggering mechanism power supply 329. The triggering mechanism power supply 329 is separate from an integrated power source 500 which powers the controller 400 and other components of the animal monitoring and deterrent device 10. Separation of the triggering mechanism power supply 329 and the integrated power source 500 allows for the controller 400 and sensors 200 to remain operational even if the triggering mechanism power supply 329 is depleted. Further, it will be appreciated that the power demands, including voltage and amperage, for the controller 400, the sensors 200, and the triggering mechanism 328 may be different and distinct such that a separate triggering mechanism power supply 329 to drive the triggering mechanism 328 may be warranted.

In various embodiments, the animal monitoring and deterrent device 10 may spray the animal deterrent up 0.25 meters, 0.5 meters, 0.75 meters, 1 meter, 1.5 meters, 2 meters, or 10 meters. It will be appreciated that as the distance of the spray from the animal monitoring and deterrent device 10 is increased the density or concentration of the spray is reduced as the animal deterrent is spread over a larger area. As such, the spray pattern and distance may be adjusted to match the target pest animal and/or particular animal deterrent utilized. The distance the animal deterrent sprays may be adjusted by controlling the flow of the animal deterrent to the nozzles 322 with greater flow resulting in increased spray distance. The flow rate of the animal deterrent may be controlled by throttling the flow from a pressurized source of animal deterrent 310 or controlling the rate of pumping from the source of animal deterrent 310.

In one or more embodiments and with reference to FIG. 1, the mounting fixture 700 further comprises mounting hardware 326 engaged with the lure body 100 to secure the animal monitoring and deterrent device 10 to a substrate 800. Further, the mounting fixture 700 provides an interface between the lure body 100, the animal deterrent delivery system 320, and/or the source of animal deterrent 310.

In one or more embodiments and with reference to FIGS. 9-11, the mounting fixture 700 may be formed from a mount 710, a central component 720, and an animal deterrent source adaptor 730. The mount 710, as illustrated in FIG. 10, is configured to engage with the lure body 100 and connect the lure body 100 to the central component 720 and ultimately the substrate 800. The central component 720 engages with the mount 710 to allow at least one of rotational, pivotal, or translational motion of the lure body 10 relative to the substrate 800 through rotation, pivoting, or translation of the mount 710 relative to the central component 720. The animal deterrent source adaptor 730, as illustrated in FIG. 11, is configured to engage with the source of animal deterrent 310 to connect the mounting fixture 700 to the source of animal deterrent 310.

The central component 720 may interface with the mount 710 to provide a rotatable swivel that couples the lure body 100 and allows the lure body 100 to rotate 360 degrees, tilt approximately 30 degrees, and lift upward ⅜" from the mounting fixture 700. This freedom of movement is important for allowing realistic motion to match animal behavior when the decoy body is acted upon by the pest animal. In various embodiments, the tilt may be at least 15 degrees, at least 20 degrees, at least 25 degrees, 15 to 60 degrees, 15 to 45 degrees, or 20 to 40 degrees. In various embodiments, the lift upward of the lure body 100 relative to the substrate 800 may be at least 0.20 inches, at least 0.25 inches, at least 0.30 inches, at least 0.4 inches, at least 0.5 inches, 0.2 to 1 inch, 0.2 to 0.8 inches, 0.3 to 1 inch, or 0.2 to 0.5 inches.

In one or more embodiments and with reference to FIG. 9, the central component 720 of the mounting fixture 700 may comprise at least a portion of the deterrent distribution manifold 324. Specifically, channels or tubes may be provided within the central component 720 to channel the animal deterrent from the source of animal deterrent 310 to the nozzles 322. In one or more embodiments, the nozzles 322 are further provided as part of the central component 720 of the mounting fixture 700. Providing the deterrent distribution manifold 324 and the nozzles 322 on the central component 720 of the mounting fixture 700 allows the one or more nozzles 322 to remain stationary during rotational, pivotal, or translational motion of the lure body 100 relative to the substrate 800. Such stability provides a more predictable spray pattern as the orientation of the lure body 100 does not affect the direction of spray.

The animal deterrent source adaptor 730 engages with the source of animal deterrent 310. In one or more embodiments and with reference to FIG. 11, the animal deterrent source adaptor 730 may include a channel 732 to direct animal deterrent from the source of animal deterrent 310 into the central component 720 for passage to the deterrent distribution manifold 324, either in the central component 720 or within the lure body 100.

In one or more embodiments, the triggering mechanism 328 may be affixed to our housed in the mounting fixture 700. For example, the triggering mechanism 328 may be provided in the central component 720 as a solenoid valve or in the animal deterrent source adaptor 730 as an actuator to controllably depress a push button on a pressurized aerosol canister The animal monitoring and deterrent device 10 includes a controller 400. The controller 400 is communicatively connected to the one or more sensors 200 and the animal deterrent mechanism 300 to send and receive data. The controller 400 analyzes data generated by the sensors 200 and activates the animal deterrent mechanism 300 to release the animal deterrent from the source of animal deterrent 310. The controller 400 includes a microcontroller 410. In further embodiments, the controller 400 additionally includes one or more of a memory chip 420, a data transfer module 430, a voltage regulator 440, a triggering mechanism connector 450, and an alarm 430.

Figure 12:
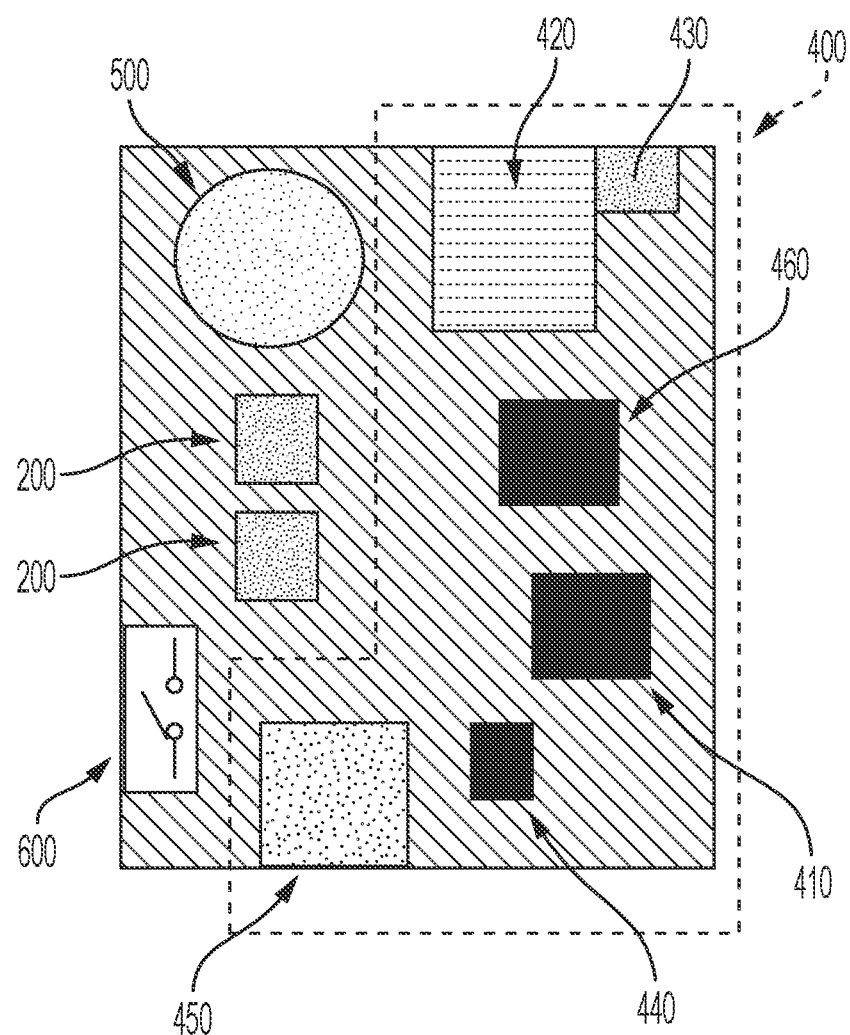
FIG. 12 is a schematic illustration of an electronic circuit board comprising the controller in accordance with one or more embodiments of the present disclosure.
Figure 13A:
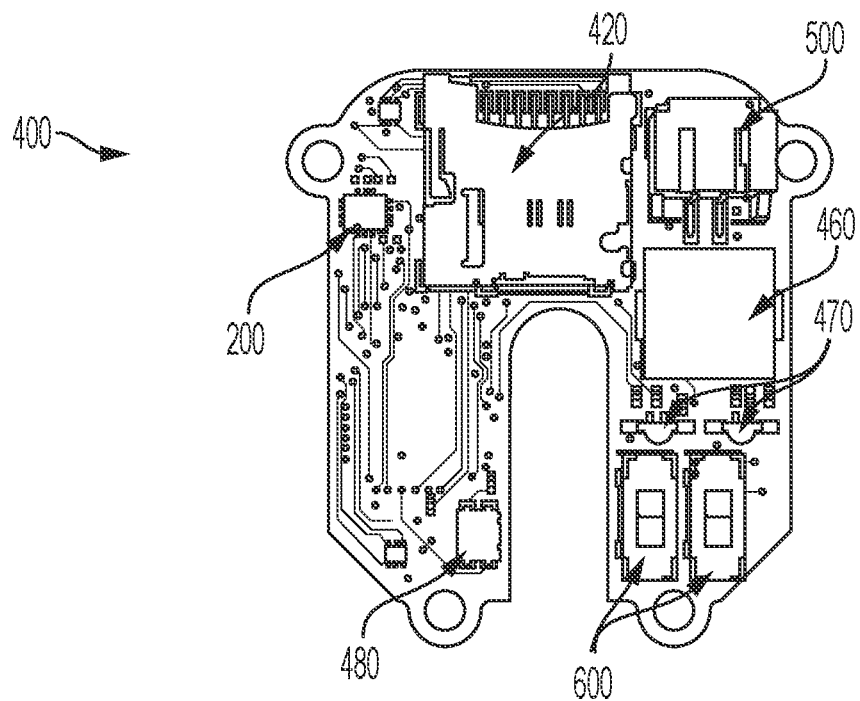
FIG. 13A is a schematic illustration of an electronic circuit board comprising the controller in accordance with one or more embodiments of the present disclosure.
Figure 13B:
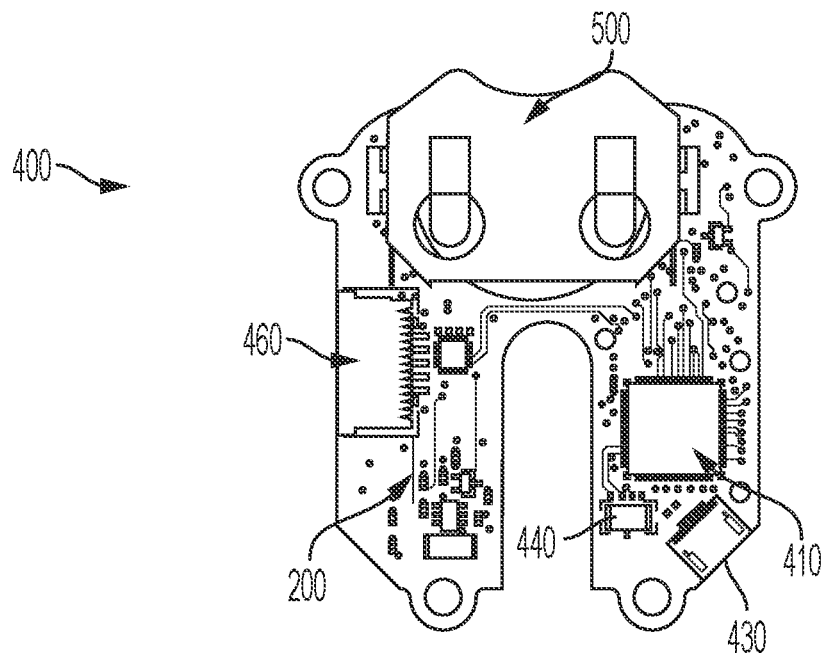
FIG. 13B is a schematic illustration of an electronic circuit board comprising the controller in accordance with one or more embodiments of the present disclosure.

With reference to FIGS. 12, 13A, and 13B, the controller 400 includes a microcontroller 410 which is a compact integrated circuit designed to govern the specific operation of the animal monitoring and device 10. One skilled in the art has familiarity with controllers in general and more specifically microcontrollers and is capable of selection of an appropriate microcontroller 410 for governing the specific operational guidelines of the animal monitoring and deterrent device 10. Examples of suitable microcontrollers 410 include those categorized as ultra-low power microcontrollers such as MSP430, TM4C123G, and CC1352 commercially from Texas Instruments (Dallas, Texas) or Pic32 commercially available from Microchip Technology Inc (Chandler, Arizona).

In one or more embodiments and with continued reference to FIGS. 12, 13A, and 13B, the controller 400 includes a memory chip 420. The memory chip 420 is configured for recording and storing sensor data received from the one or more sensors 200.

In one or more embodiments, during the period before detection of a pest animal the sensor data may be recorded in the memory chip 420 in a buffered manner. The memory chip 420 or a buffer memory portion of the memory chip 420 may be periodically overwritten until detection of the pest animal, and as such may record a constantly changing set of data. It will be appreciated that periodically overwriting the buffer memory portion of the memory chip 420 may include a circumstance where continuous overwriting occurs. In one or more embodiments, the oldest data may be discarded and overwritten as memory space is required for newly input date in a first-in, first-out manner. In further embodiments, the overwriting of recorded data in the buffer memory portion of the memory chip 420 may be completed in a more complex manner with retention of differing timespans of each quantitative parameter within the sensor data from the one or more sensors 200. For example, 15 minutes of sound data may be retained before overwriting whereas 5 minutes of acceleration data is retained before overwriting. It will be appreciated that the specific timespans and quantitative parameters may vary and can be selected to document the relevant periods for a specific activity or anticipated event associated with the field of implementation of the animal monitoring and deterrent device 10.

In one or more embodiments, immediately subsequent to detection of a pest animal sensor data is recorded to the memory chip 420 for retention. The recording of the sensor data to the memory chip 420 may continue until completion of the interaction with or detection of the pest animal. Additionally, upon detection of the pest animal and the concurrent activation of the sensor data stored within the buffer memory portion of the memory chip 420 may be transferred to another region of the memory chip 420 or simply relabeled within the memory chip 420 for retention. Specifically, the buffer memory data is stored as pre-triggering event data.

The memory chip 420 may be formed from one or multiple memory units to achieve both the buffer memory and retained storage of sensor date. The memory chip 420 may include non-volatile memory configured to record the data transferred from the buffer memory portion of the memory chip 420 as well as the sensor data collected during and immediately subsequent to detection of a pest animal. Provision of non-volatile memory allow for retention of the stored data in the event of complete loss or depletion of the integrated power source 500.

In one or more embodiments, the buffer memory portion of the memory chip 420 is provided as a separate memory component from the microprocessor 410 with recorded sensor data transmitted thereto from the microprocessor 410 for temporary storage. It will be appreciated that provision of a separate memory component for the buffer memory allows for utilization of a standard microprocessor 410 across differing implementations of the animal monitoring and deterrent device 10 while allowing the storage capacity or type of memory serving as the buffer memory to vary to match the anticipated needs.

In one or more embodiments, the microcontroller 410 (or other components of the animal monitoring and deterrent device 10) may provide a real-time clock such that an accurate timestamp may be associate with each recording of data from the one or more sensors 200 and more particularly a timestamp may be associated with each triggering event.

The buffer memory portion of the memory chip 420 may be provided as volatile or non-volatile memory. Examples of the types of memory which may be implemented as the buffer memory include dynamic random-access memory (DRAM), static random-access memory (SRAM), ferroelectric random-access memory (FRAM), flash memory, or magnetic memory. In one or more embodiments, the buffer memory 130 may comprise FRAM with a capacity of at least 256 kilobytes (kB), at least 512 kB, at least 1024 KB (alternatively referenced as 1 megabyte (MB)), or at least 2 MB. The FRAM memory may be included as a component of the microcontroller 160. It will be appreciated that the capacity of the buffer memory 130 must be sufficient to record at least 10 to 15 seconds of sensor data for retention of sensor parameters prior to the detection of the pest animal.

The memory chip 420 provides a permanent storage location for sensor data acquired before, during, and after detection of the pest animal. Specifically, the memory chip 420 is connected to the microcontroller 110 to receive sensor data for recordation and analysis subsequent to the triggering event. In one or more embodiments, the memory chip 420 may comprise non-volatile memory such as FRAM or magnetic memory. For example, the data storage module 140 may be the MX25R6435F FLASH memory commercially available from Macronix (Hsinchu, Taiwan). In various embodiments, the data storage module 140 may have a capacity of at least 4 MB, at least 8 MB, at least 16 MB, or at least 32 MB. It will be appreciated that the capacity of the data storage module 140 must be sufficient to record at least 10 to 15 seconds of sensor data for retention of sensor parameters subsequent to the detection of the pest animal with retention of at least 5 minutes of data desired.

It will be appreciated that technological progression may change the nominal capacity and/or type of memory utilized for the buffer memory and/or the memory chip 420 without deviating from the thrust of the present disclosure. Specifically, new types of volatile and non-volatile memory may be developed in future years which are cheaper, smaller, and/or more efficient and it is anticipated that such memory may be incorporated in the animal monitoring and deterrent device 10 while maintaining the novel and inventive features of such system. Further, it will be appreciated that the necessary capacity of the buffer memory and/or the memory chip 420 may be determined to be commensurate with that needed to record a sufficient time period of sensor data in accordance with the contemporary data storage and compression protocols when the animal monitoring and deterrent device is manufactured.

The data transfer module 430 provides transmission of data stored in the memory chip 420 to an external storage device. In various embodiments, the data transfer module 430 may operate in a wired or wireless manner. For example, the data transfer module 430 may comprise a wireless transmitter capable of wirelessly transmitting the data stored in the memory chip 420 using a known wireless data transfer protocol. Non-limiting examples of wireless data transfer protocols include Bluetooth and Wi-Fi (IEEE 802.11). The data transfer module 170 may also or alternatively be provided with a wired connection to the external storage device such as Universal Serial Bus (USB), FireWire (IEEE 1394), Ethernet, eSATA, and Thunderbolt connections. Such wired connections provide the capability to power the memory chip 420 if necessary for the data transfer procedure.

In one or more embodiments, the data transfer module 430 may also be leveraged to input data into the microcontroller 410 as a programming port. It will be appreciated that in various embodiments, the programming port may be provided as a component of the data transfer module 430 or as a separate independent component of the controller 400.

In one or more embodiments and with continued reference to FIGS. 12, 13A, and 13B, the animal monitoring and deterrent device 10 may further comprise a power regulator to control the power received from the integrated power source 500. In one or more embodiments, the controller 400 includes a voltage regulator 440 as the power regulator. As appreciated by one skilled in the art, the voltage regulator 440 generates a fixed output voltage of a preset magnitude that remains constant regardless of changes to its input voltage or load conditions.

In one or more embodiments and with continued reference to FIGS. 12, 13A, and 13B, the controller 400 includes a triggering mechanism connector 450. The triggering mechanism connector 450 is configured to interface between the microcontroller 410 and the triggering mechanism 328. Upon detection of a pest animal, the microcontroller 410 may send a signal to the triggering mechanism 328 via the triggering mechanism connector 450 to activate of the animal deterrent delivery system 320 and release the animal deterrent from the source of animal deterrent 310. It will be appreciated that connecting the triggering mechanism 328 via the triggering mechanism connector 450 allows for utilization of different styles of triggering mechanisms 328 and/or sources of animal deterrent 310 with a standardized controller 400.

In one or more embodiments and with continued reference to FIGS. 12, 13A, and 13B, the controller 400 includes an alarm 460. The alarm 460 provides a buzz, siren, or other audible tone upon detection of a pest animal and activation of the animal deterrent mechanism 300. The alarm 460 provides an additional stimulus to drive the pest animal away as well as providing notice to any operators in the vicinity. It will be appreciated that a high decibel sound would scare away any pest animals which trigger the animal monitoring and deterrent device 10. Further, the alarm 460 may also be triggered to provide audible notification to people in the vicinity of the animal monitoring and deterrent device 10 that the animal monitoring and deterrent device 10 has been turned on. The alarm 460 may alternatively or additionally generate an electrical shock to drive away the pest animal. Further, in addition to, or as an alternative to, frightening the pest animal away, inclusion of an alarm 460 to generate an audible tone and/or shock implants doubt in the mind of the pest animal on next approach to a similar prey animal. The goal is to install an inversion instinct into the pest animal and adding noise or electric shock adds further modes of stimulus and will deepen the impression in the pest animal's consciousness.

In one or more embodiments and with reference to FIGS. 13A and 13B, the controller 400 includes one or more signaling lights 470 indicating the status of the animal monitoring and deterrent device 10 or one or more subcomponents of the animal monitoring and deterrent device 10. For example, the signaling lights 470 may provide indicia of the health or remaining capacity of the integrated power source 500, the health or remaining capacity of the memory chip 420, and/or the status of the microcontroller 110. Additionally, the signaling lights 470 may indicate the current operational mode of the animal monitoring and deterrent device 10. Specifically, the signaling lights 470 may indicate the animal monitoring and deterrent device 10 is armed and actively monitoring the one or more sensors 200 for indication of the presence of pest animals. For example, the signaling lights 470 may appear a certain color or change color to indicate current battery level. Further, the signaling lights 470 may be illuminated in a flashing manner to indicate quantitative information, such as the number of times the animal deterrent was sprayed.

In one or more embodiments, the signaling lights 479 may comprise light-emitting diodes (LED). Further, in one or more embodiments, the signaling lights 479 may only be illuminated upon depression of a push button 480 or toggling of a switch 600 to conserve power. For example, the push button 480 may be used as a status indicator, such as battery life status, with the signaling lights 479 providing battery status. Additionally, the push button 480 may activate the signaling lights 479 blink a certain number of times to show how many times the system has been attacked. In one or more embodiments, the push button 480 may also be used as an alternative for activating or deactivating the animal monitoring and deterrent device 10, In one or more embodiments and with reference to FIGS. 12, 13A, and 13B, the animal deterrent delivery system 320 further comprises an integrated power source 500 to provide electrical power to the controller 400, the sensors 200, and the an animal deterrent mechanism 300. As such, it will be appreciated that in one or more embodiments, the disclosed animal monitoring and deterrent device 10 may be self-contained, requiring no external power. The integrated power source 500 provides the electrical power for operation of the animal monitoring and deterrent device 10 without the need for connection to an alternative source of power. In one or more embodiments, a low-profile battery serving as the integrated power source 50 is provides as part of the animal monitoring and deterrent device 10. Examples of low-profile batteries include button cell batteries and thin film batteries such as a thin film lithium battery. The integrated power source 500 may also comprise a battery without a low profile as space within the animal monitoring and deterrent device 10 allows. The integrated power source 500 may be sized such that the animal monitoring and deterrent device 10 is capable of operating for the deployment schedule of the animal monitoring and deterrent device 10 without replacement or recharging. In various embodiments, the scheduled deployment of the animal monitoring and deterrent device 10 may be 1 week, 2 weeks, 1 month, 3 month, 6 months, 12 months, 18 months, or 24 months. It will be appreciated that the animal monitoring and deterrent device 10 is described as not requiring replacement or recharging of the integrated power source 500; however, embodiments with the capability to replace or recharge the integrated power source 500 on a periodic basis are additionally envisioned.

It will be appreciated that the capacity, expressed in units such as milliAmp-hours (mAh), of the integrated power source 500 may be selected to allow operation of the animal monitoring and deterrent device 10 for the scheduled deployment of the animal monitoring and deterrent device 10. The integrated power source 500 may be sized to provide a scheduled 4 to 20 mAh for each week of the planned scheduled deployment. In one or more embodiments, the integrated power source 500 may be sized to provide a scheduled 15 mAh for each week of the planned scheduled deployment. As such, in various embodiments the integrated power source 500 may have a capacity of at least 48 mAh, at least 80 mAh, at least 100 mAh, at least 150 mAh, at least 240 mAh, or approximately 200 mAh. An example integrated power source 500 may be a single CR2 battery which is 3 volts and 2 mAh. The integrated power source 500 may be simply swapped out or recharged in various embodiments.

In one or more embodiments and with reference to FIGS. 12, 13A, and 13B, the animal monitoring and deterrent device 10 includes a switch 600 to manually power the animal monitoring and deterrent device 10 on and off. The switch 600 may be a mechanical switch such as a toggle switch or the switch 600 may be software based with a user input to the controller 400 transitioning the animal monitoring and deterrent device 10 to a powered on state ready for deployment.

In one or more embodiments, the animal monitoring and deterrent device 10 may be transitioned between an armed and a disarmed state with a magnetic sensor. An example magnetic sensor is a Hall effect sensor which is a type of sensor which detects the presence and magnitude of a magnetic field using the Hall effect. Using a magnetic sensor, the animal monitoring and deterrent device 10 may be armed and disarmed from a distance using an extendable magnetic tool to avoid inadvertently triggering the animal deterrent mechanism 300 to release the animal deterrent from the source of animal deterrent 310.

The controller 400 and related circuitry as illustrated in FIGS. 12, 13A, and 13B may be housed in various locations within the animal monitoring and deterrent device 10. In one or more embodiments, the controller 400 and related circuitry may be positioned within the interior volume of the lure body 100 such as illustrated in FIGS. 1, 5, and 6. In one or more embodiments, the controller 400 and related circuitry may be positioned within the subterranean housing 312.

Utilizing the animal monitoring and deterrent device 10, pest animals may be deterred from attacking endangered or threatened species. Methods of deterring the pest animal from attacking endangered or threatened species include deploying the animal monitoring and deterrent device 10 in accordance with the present disclosure, detecting with the one or more sensors 200 movement or presence of the pest animal proximal to the animal monitoring and deterrent device 10, confirming the identity of the pest animal by matching data received from the one or more sensors 200 to animal activity profiles, sensor thresholds, or both stored in the controller 400, and activating the animal deterrent mechanism 300 to release the animal deterrent from the source of animal deterrent 310 to scare away the pest animal after the identity of the pest animal is confirmed.

Figure 14:
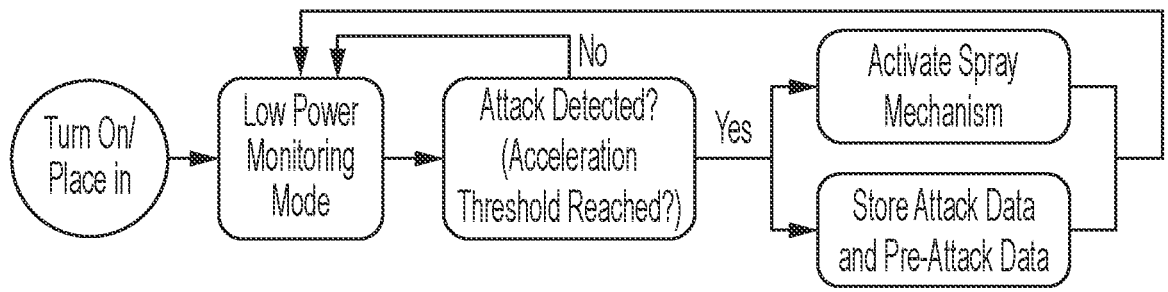
FIG. 14 is a flow chart of operation of the animal monitoring and deterrent device in accordance with one or more embodiments of the present disclosure.

With reference to FIG. 14, the animal monitoring and deterrent device 10 may operate in accordance with a specified process flow. Initially the animal monitoring and deterrent device 10 is placed into service and placed on or in the substrate 800. For example the animal monitoring and deterrent device 10 may be placed onto sand in an environment where a tortoise would typically be found to train the pest animal to not interfere with tortoises. After placement of the animal monitoring and deterrent device 10 into service the animal monitoring and deterrent device 10 is powered on and initially operates in a low power monitoring mode. In the low power monitoring mode the animal monitoring and deterrent device 10 records sensor data from the one or more sensors 200 into the buffer memory and the microcontroller 410 analyzes the data in real-time for attacked by or presence of a pest animal. Upon disturbance of the animal monitoring and deterrent device 10 or a change in sensor data from one or more of the sensors 200 the microcontroller 410 makes a determination regarding if the sensor data is indicative of an attack by or the presence of a pest animal. If the microcontroller 410 determines such sensor data is not indicative of a pest animal the animal monitoring and deterrent device 10 is returned to the low power monitoring mode. Changes in sensor data which are not indicative of the presence of a pest animal may be triggered by environmental disturbances such as a heavy rain or wind. If the microcontroller 410 determines the change in sensor data is indicative of a pest animal the animal monitoring and deterrent device 10 the animal deterrent delivery system 320 may be activated to discharge the animal deterrent. Additionally, the pre-attack sensor data in the buffer memory may be retained as well as the sensor data captured during and for a period after the attack.

In one or more embodiments, the microcontroller 410 determines if the sensor data is indicative of a pest animal by matching to animal behavior profiles. For example, acceleration data can be compared to expected acceleration data, either simulated or recorded from previous verified attacks, for an attack by the pest animal of interest to determine if the profiles are aligned. Such comparison allows for disturbances from the environment or from other than the pest animal to be distinguished from true disturbances from the pest animal. The image sensor may also be used to compare a captured image to known images of pest animals of interest to determine or validate the presence of a pest animal.

In one or more embodiments, the microcontroller 410 determines if the sensor data is indicative of a pest animal by determining if the sensor data from one or more sensors 200 exceeds a predetermined sensor threshold. For example, an acceleration greater than a certain threshold may be indicative of a swift attack by a pest animal and at a rate not expected to be experienced from rain or wind disturbances.

In one or more embodiments, only a sub-set of the one or more sensors 200 may be active during the low power monitoring mode. Upon determination or suspicion of the presence of a pest animal based on the sub-set of sensors 200, additional sensors may be active to confirm or validate the initial determination. For example, an acceleration or pressure sensor may provide initial suspicion of the presence of a pest animal at which time the optical and/or sound sensor is active to confirm the image and/or sounds also align with those expected for the pest animal. Such operation allows for reduced power consumption until the presence of a pest animal is suspected, at which time the activation of additional sensors and their increased power draw may be utilized to confirm the identity of the pest animal.

Figure 15:
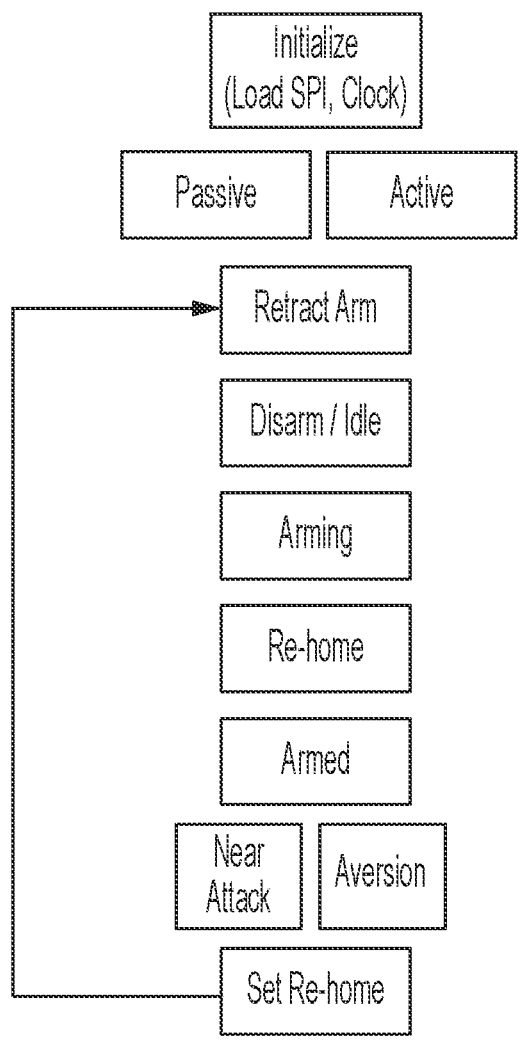
FIG. 15 is a flow chart of operation of the animal monitoring and deterrent device in accordance with one or more embodiments of the present disclosure.

In one or more embodiments and with reference to FIG. 15, the microcontroller 410 may switch the animal monitoring and deterrent device 10 between a passive mode and an active mode. Specifically, the controller 400 may initialize the animal monitoring and deterrent device 10 and set the clock, the state of the machine, and the one or more sensors 200 upon start-up of the animal monitoring and deterrent device 10. Subsequently, the controller 400 may set the animal monitoring and deterrent device 10 into passive mode where the animal deterrent mechanism 300 and/or the alarm 460 are inactive or into active mode where the animal deterrent mechanism 300 and/or the alarm 460 are active. The mode may be selected based on the status of the integrated power source 500 and/or the triggering mechanism power supply 329 to ensure continued data acquisition from the sensors 200 in the case of low power reserves. It will be appreciated that other criteria may be utilized to determine active mode or passive mode status. The controller 400 may signal to retract arm to move the triggering mechanism 328 into a safety position such as moving the actuator off the push button of a pressurized aerosol canister. In such state, the signaling lights 470 may indicate the Disarm/Idle status. Upon transition back to an active status the animal monitoring and deterrent device 10 undergoes arming where the alarm 460 may provide a tone to notify the area around the animal monitoring and deterrent device 10 that the triggering mechanism 328 is being rearmed. The controller 400 may also re-home the sensors 200 monitoring the positon of the lure body 100 to update the baseline x, y, and z-axis positioned to reflect the current position of the lure body 100. Such update allows for future disturbances to be easily noted. Once the animal monitoring and deterrent device 10 has been armed it is ready for deterrence of pest animals.

The controller 400 monitors for near attack or aversions and provides release of animal deterrent with the animal deterrent delivery system 300 and/or a threatening sound from the alarm 460 to deter the pest animal. A near attack is defined as an acceleration level that registers under a predefined "aversion or attack" threshold but above a lower secondary "monitoring" threshold. In such circumstance, the animal monitoring and deterrent device 10 does not react or spray, but does record data. The aversion happens once that aversion or attack threshold is surpassed. Such arrangement allows for the animal monitoring and deterrent device 10 to record the acceleration caused by rain droplets without the animal monitoring and deterrent device 10 actually spraying when hit by rain. If aversion occurs repeatedly in a short period the controller 400 sets re-home again to recalibrate the positioned of the lure body 100 and the controller 400 may send a signal to retract arm of the triggering mechanism 328 into the safety position for a disarmed/idle time before rearming the system.

Having described various embodiments, it should be understood that the various aspects of the animal monitoring and deterrent device are described and such aspects may be utilized in conjunction with various other aspects.

In a first aspect, the disclosure of an animal monitoring and deterrent device is provided. The animal monitoring and deterrent device comprises: a lure body, the lure body configured to attract the attention of a pest animal and conceal one or more components of the device; one or more sensors, the sensors configured to detect movement or presence of the pest animal proximal to the device; an animal deterrent mechanism, where the animal deterrent mechanism comprises: a source of animal deterrent, wherein the source of animal deterrent is a pressurized or pumped liquid, gas, or aerosol of an irritant to the pest animal, and an animal deterrent delivery system fluidly connected to the source of animal deterrent, the animal deterrent delivery system configured to disperse the animal deterrent upon activation of the animal deterrent delivery system, wherein the animal deterrent delivery systems comprises a triggering mechanism that releases at least a portion of the animal deterrent from the source of animal deterrent upon receipt of a signal from the controller; a mounting fixture engaged with the lure body, the mounting fixture configured to secure the lure body to a base structure engaged with a substrate, wherein the mounting fixture allows at least one of rotational, pivotal, or translational motion of the lure body relative to the substrate; and a controller communicatively connected to the one or more sensors and the animal deterrent mechanism, where the controller analyzes data generated by the sensors and activates the animal deterrent mechanism to release the animal deterrent from the source of animal deterrent.

In a second aspect, the disclosure provides the device of the first aspect, in which the one or more sensors comprise one or more of an accelerometer, an angular sensor, an inertial measurement unit (IMU), a shock or impact sensor, a proximity sensor, and a capacitive sensor.

In a third aspect, the disclosure provides the device of the first or second aspect, in which the one or more sensors comprise a sound sensor.

In a fourth aspect, the disclosure provides the device of any of the first through third aspects, in which the one or more sensors comprise an optical sensor.

In a fifth aspect, the disclosure provides the device of any of the first through fourth aspects, in which the lure body comprises a shaped exterior surface replicating the appearance of an animal body, egg, nest, or shelter.

In a sixth aspect, the disclosure provides the device of any of the first through fifth aspects, in which the animal deterrent is an irritant to the pest animal.

In a seventh aspect, the disclosure provides the device of the sixth aspect, in which the animal deterrent comprises methyl anthranilate.

In an eighth aspect, the disclosure provides the device of any of the first through seventh aspects, in which the source of animal deterrent is a pressurized aerosol canister.

In a ninth aspect, the disclosure provides the device of any of the first through eighth aspects, in which the animal deterrent delivery system comprises a deterrent distribution manifold to direct the animal deterrent towards one or more nozzles to disperse the animal deterrent toward the pest animal.

In a tenth aspect, the disclosure provides the device of the ninth aspect, in which the deterrent distribution manifold comprises a plurality of nozzles to direct the animal deterrent in a plurality of directions.

In an eleventh aspect, the disclosure provides the device of the ninth or tenth aspect, in which the deterrent distribution manifold is integrated into the lure body such that the deterrent distribution manifold and the lure body form a monolithic unit.

In a twelfth aspect, the disclosure provides the device of the ninth or tenth aspect, in which the deterrent distribution manifold is integrated into the mounting fixture.

In a thirteenth aspect, the disclosure provides the device of the twelfth, in which the one or more nozzles remain stationary during rotational, pivotal, or translational motion of the lure body relative to the substrate.

In a fourteenth aspect, the disclosure provides the device of any of the first through thirteenth aspects, in which the animal monitoring and deterrent device further comprises a subterranean housing with the source of animal deterrent, the controller, or both the source of animal deterrent and the controller positioned within the subterranean housing.

In a fifteenth aspect, the disclosure provides the device of any of the first through fourteenth aspects, in which the lure body comprises at least two parts which may be reversibly separated to access an interior volume of the lure body.

In a sixteenth aspect, the disclosure provides the device of any of the first through fifteenth aspects, in which the controller is positioned within the interior volume of the lure body.

In a seventeenth aspect, the disclosure provides the device of any of the first through sixteenth aspects, in which the triggering mechanism comprises a linear actuator to release the animal deterrent from the pressurized aerosol canister upon receipt of the signal from the controller.

In an eighteenth aspect, the disclosure provides the device of any of the first through sixteenth aspects, in which the triggering mechanism comprises a solenoid valve to release the animal deterrent from the source of animal deterrent upon receipt of the signal from the controller.

In a nineteenth aspect, the disclosure provides the device of any of the first through eighteenth aspects, in which the animal deterrent delivery system further comprises an integrated power source to provide electrical power to the controller, the sensors, and the an animal deterrent mechanism.

In a twentieth aspect, the disclosure provides the device of any of the first through nineteenth aspects, in which the controller comprises a memory chip for recording and storing sensor data received from the one or more sensors.

In a twenty-first aspect, the disclosure provides the device of any of the first through twentieth aspects, in which the mounting fixture allows 360 degree rotational motion, at least 15 degrees of pivotal motion of the lure body relative to the substrate.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a," "an" and "the" include plural referents unless the context clearly dictates otherwise. Thus, for example, reference to "a" component includes aspects having two or more such components, unless the context clearly indicates otherwise.

Optional or optionally means that the subsequently described event or circumstances may or may not occur. The description includes instances where the event or circumstance occurs and instances where it does not occur.

It should be understood that any two quantitative values assigned to a property or measurement may constitute a range of that property or measurement, and all combinations of ranges formed from all stated quantitative values of a given property or measurement are contemplated in this disclosure.

As used here and in the appended claims, the words "comprise," "has," and "include" and all grammatical variations thereof are each intended to have an open, non-limiting meaning that does not exclude additional elements or steps.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. An animal monitoring and deterrent device comprising:
a lure body;
one or more sensors, the sensors configured to detect movement or presence of the pest animal proximal to the animal monitoring and deterrent device;
an animal deterrent mechanism, where the animal deterrent mechanism comprises:
a source of animal deterrent, wherein the source of animal deterrent is a pressurized or pumped liquid, gas, or aerosol of an irritant to the pest animal, and
an animal deterrent delivery system fluidly connected to the source of animal deterrent, the animal deterrent delivery system is configured to disperse an animal deterrent upon activation of the animal deterrent delivery system, wherein the animal deterrent delivery systems comprises:
a triggering mechanism that releases at least a portion of the animal deterrent from the source of animal deterrent upon receipt of a signal from a controller, and
a deterrent distribution manifold to direct the animal deterrent towards one or more nozzles to disperse the animal deterrent toward the pest animal, wherein the deterrent distribution manifold comprises branching internal channels integrated into the lure body such that the deterrent distribution manifold and the lure body form a monolithic unit;
a mounting fixture engaged with the lure body, the mounting fixture comprising a mount and a central component and is configured to secure the lure body to a base structure engaged with a substrate,
wherein the mount engages with both the lure body and the central component;
wherein the mounting fixture allows rotational, pivotal, and
translational motion of the lure body relative to the substrate through rotation,
pivoting, and translation of the mount relative to the central component; and
the controller, where the controller is communicatively connected to the one or more sensors and the animal deterrent mechanism and where the controller analyzes data generated by the sensors and activates the animal deterrent mechanism to release the animal deterrent from the source of animal deterrent,
wherein shape and coloration of the lure body is configured to attract the attention of a pest animal prior to release of the animal deterrent from the source of animal deterrent and conceal the deterrent distribution manifold.

2. The animal monitoring and deterrent device of claim 1, wherein the one or more sensors comprise one or more of an accelerometer, an angular sensor, an inertial measurement unit (IMU), a shock or impact sensor, a proximity sensor, and a capacitive sensor.

3. The animal monitoring and deterrent device of claim 1, wherein the one or more sensors comprise a sound sensor.

4. The animal monitoring and deterrent device of claim 1, wherein the one or more sensors comprise an optical sensor.

5. The animal monitoring and deterrent device of claim 1, wherein the lure body comprises a shaped exterior surface replicating the appearance of an animal body, egg, nest, or shelter.

6. The animal monitoring and deterrent device of claim 1, wherein the deterrent distribution manifold is fluidly connected to a plurality of the one or more nozzles to direct the animal deterrent in a plurality of directions.

7. The animal monitoring and deterrent device of claim 1, wherein the animal monitoring and deterrent device further comprises a subterranean housing with the source of animal deterrent, the controller, or both the source of animal deterrent and the controller positioned within the subterranean housing.

8. The animal monitoring and deterrent device of claim 1, wherein the triggering mechanism comprises a solenoid valve to release the animal deterrent from the source of animal deterrent upon receipt of the signal from the controller.

9. The animal monitoring and deterrent device of claim 1, wherein the animal deterrent delivery system further comprises an integrated power source to provide electrical power to the controller, the sensors, and the an animal deterrent mechanism.

10. The animal monitoring and deterrent device of claim 1, wherein the controller comprises a memory chip for recording and storing sensor data received from the one or more sensors.

11. The animal monitoring and deterrent device of claim 1, wherein the mounting fixture allows 360 degree rotational motion and at least 15 degrees of pivotal motion of the lure body relative to the substrate.

12. The animal monitoring and deterrent device of claim 1, wherein the animal deterrent is an irritant to the pest animal.

13. The animal monitoring and deterrent device of claim 12, wherein the animal deterrent comprises methyl anthranilate.

14. The animal monitoring and deterrent device of claim 1, wherein the source of animal deterrent is a pressurized aerosol canister.

15. The animal monitoring and deterrent device of claim 14, wherein the triggering mechanism comprises a linear actuator to release the animal deterrent from the pressurized aerosol canister upon receipt of the signal from the controller.

16. The animal monitoring and deterrent device of claim 1, wherein the lure body comprises at least two parts which may be reversibly separated to access an interior volume of the lure body.

17. The animal monitoring and deterrent device of claim 16, wherein the controller is positioned within the interior volume of the lure body.

* * * * *